(12) United States Patent
McGhie et al.

(10) Patent No.: US 8,201,734 B1
(45) Date of Patent: *Jun. 19, 2012

(54) CONVERSION OF NON-NEGOTIABLE CREDITS ASSOCIATED WITH AN ENTITY INTO ENTITY INDEPENDENT NEGOTIABLE FUNDS

(76) Inventors: Sean I. McGhie, Boca Raton, FL (US); Brian K. Buchheit, Davie, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/428,656

(22) Filed: Mar. 23, 2012

Related U.S. Application Data

(63) Continuation of application No. 11/420,255, filed on May 25, 2006, now Pat. No. 7,703,673.

(51) Int. Cl.
*G06K 5/00* (2006.01)
(52) U.S. Cl. ......... 235/380; 235/375; 235/379; 235/487
(58) Field of Classification Search .................. 235/380, 235/375, 379, 487, 486; 705/14, 39
See application file for complete search history.

(56) References Cited

U.S. PATENT DOCUMENTS

| | | | |
|---|---|---|---|
| 4,607,155 A | 8/1986 | Nao |
| 5,290,033 A | 3/1994 | Bittner |
| 5,397,125 A | 3/1995 | Adams |
| 5,564,546 A | 10/1996 | Molbak |
| 5,609,337 A | 3/1997 | Clapper |
| 5,635,696 A | 6/1997 | Dabrowski |
| 5,674,123 A | 10/1997 | Roberson, Jr. |
| 5,689,100 A | 11/1997 | Carrithers |
| 5,761,647 A | 6/1998 | Boushy |
| 5,774,870 A | 6/1998 | Storey |
| 5,779,549 A | 7/1998 | Walker |
| 5,823,874 A | 10/1998 | Adams |
| 5,919,091 A | 7/1999 | Bell |
| 5,935,000 A | 8/1999 | Sanchez, III |
| 5,941,771 A | 8/1999 | Haste, III |
| 5,943,241 A | 8/1999 | Nichols |
| 5,949,042 A | 9/1999 | Dietz |
| 5,980,385 A | 11/1999 | Clapper |
| 5,993,316 A | 11/1999 | Coyle |
| 6,003,013 A | 12/1999 | Boushy |
| 6,015,344 A | 1/2000 | Kelly |
| 6,048,269 A | 4/2000 | Burns |
| 6,098,837 A | 8/2000 | Izawa |
| 6,178,408 B1 | 1/2001 | Copple |
| 6,280,326 B1 | 8/2001 | Saunders |

(Continued)

FOREIGN PATENT DOCUMENTS

WO   WO9215174 A1   3/1992

*Primary Examiner* — Edwyn Labaze
(74) *Attorney, Agent, or Firm* — Patents on Demand, P.A.; Brian K. Buchheit; Scott M. Garrett

(57) ABSTRACT

Non-negotiable credits can be identified that are from previous interactions with an entity. The previous interactions can earn the non-negotiable credits. A quantity of the non-negotiable credits can be converted to a quantity of negotiable funds. The converting can be performed by a different legal entity than the entity. Access to the quantity of negotiable funds can be permitted for purchases with at least one vender that does not honor the non-negotiable credits in absence of the converting of the non-negotiable credits into negotiable funds. The identifying, the converting, and the permitting can be performed by computing equipment having at least one processor executing program instructions that are digitally encoded in at least one storage device.

30 Claims, 3 Drawing Sheets

U.S. PATENT DOCUMENTS

| | | |
|---|---|---|
| 6,280,328 B1 | 8/2001 | Holch |
| 6,289,261 B1 | 9/2001 | Hiedel |
| 6,293,867 B1 | 9/2001 | Heidel |
| 6,306,035 B1 | 10/2001 | Kelly |
| 6,311,976 B1 | 11/2001 | Yoseloff |
| 6,315,665 B1 | 11/2001 | Faith |
| 6,332,099 B1 | 12/2001 | Heidel |
| 6,352,175 B2 | 3/2002 | Izawa |
| 6,394,907 B1 | 5/2002 | Rowe |
| 6,533,664 B1 | 3/2003 | Crumby |
| 6,554,705 B1 | 4/2003 | Cumbers |
| 6,645,077 B2 | 11/2003 | Rowe |
| 6,648,755 B1 | 11/2003 | Luciano, Jr. |
| 6,685,559 B2 | 2/2004 | Luciano |
| 7,134,959 B2 | 11/2006 | Penrice |
| 7,200,571 B1 | 4/2007 | Jenniges |
| 2001/0044337 A1 | 11/2001 | Rowe |
| 2001/0054003 A1 | 12/2001 | Chien |
| 2002/0020965 A1 | 2/2002 | Potter |
| 2002/0111210 A1 | 8/2002 | Luciano, Jr. |
| 2002/0169021 A1 | 11/2002 | Urie |
| 2002/0198043 A1 | 12/2002 | Chowdhury |
| 2006/0046827 A1 | 3/2006 | Saffari |
| 2006/0052150 A1 | 3/2006 | Hedrick |
| 2007/0167218 A1 | 7/2007 | Rothschild |

CONVERSION OF NON-NEGOTIABLE CREDITS ASSOCIATED WITH AN ENTITY INTO ENTITY INDEPENDENT NEGOTIABLE FUNDS

CROSS-REFERENCE TO RELATED APPLICATIONS

This continuation application claims the benefit of U.S. patent application Ser. No. 11/420,255 filed 25 May 2006 entitled "Web Based Conversion of Non-Negotiable Credits Associated with an Entity to Entity Independent Negotiable Funds." The entire contents of U.S. application Ser. No. 11/420,255 are incorporated by reference herein.

BACKGROUND

The present disclosure relates to the field of fund conversions and, more particularly, to the conversion of non-negotiable credits to negotiable funds.

Entities often reward consumers for utilizing their services with non-negotiable credits, such as frequent flier miles, consumer loyalty points, and entertainment credits. These non-negotiable credits can be applied towards products and/or services provided by a granting entity or its affiliates. For example, consumers can apply frequent flyer credits towards the purchase of airline tickets or airline upgrades. In another example, a consumer can utilize purchase points from a credit card company to receive percentage discounts on goods provided by affiliates. In still another example, entertainment credits can be redeemed for prizes offered in a winnings storefront of an entertainment site.

Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective. For instance, airlines often limit the choice of travel dates, known as black-out dates, to which frequent flyer credits can be applied.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. For instance, consumers participating in online entertainment sites often are required to wait a minimum of three days for their entertainment credits to be redeemed. Redemption delay can be particularly aggravating to e-commerce consumers, who by nature of an e-commerce marketplace expect rapid responses and immediate consumer gratification.

Time can also be a factor for redeeming credits having an associated expiration date. A consumer's non-negotiable credits may expire before a sufficient quantity is acquired for a desired purchase. Lesser purchases requiring fewer credits may not have a significant appeal for the consumer. Hence, credit expiration dates can further decrease the consumer value of non-negotiable credits.

Yet another problem with conventional implementation of non-negotiable credits is that consumers often belong to multiple credit-earning programs that provide the consumers with multiple incompatible forms of non-negotiable credit. Each of these multiple programs can span a single industry or can span multiple industries. For example, a consumer can acquire a moderate number of frequent flyer miles with multiple airlines, where each airline specific account contains insufficient credits to have any meaningful consumer value. Consumers can also have many different types of non-negotiable credits, such as multiple merchant specific credit, credit card credits, and frequent flier miles, each having different redemption values and program redemption rules. These different programs, values, and rules can understandably confuse and frustrate consumers, who due to their confusion, often elect to avoid participating in an entity sponsored credit program.

DETAILED DESCRIPTION

Figure 1:
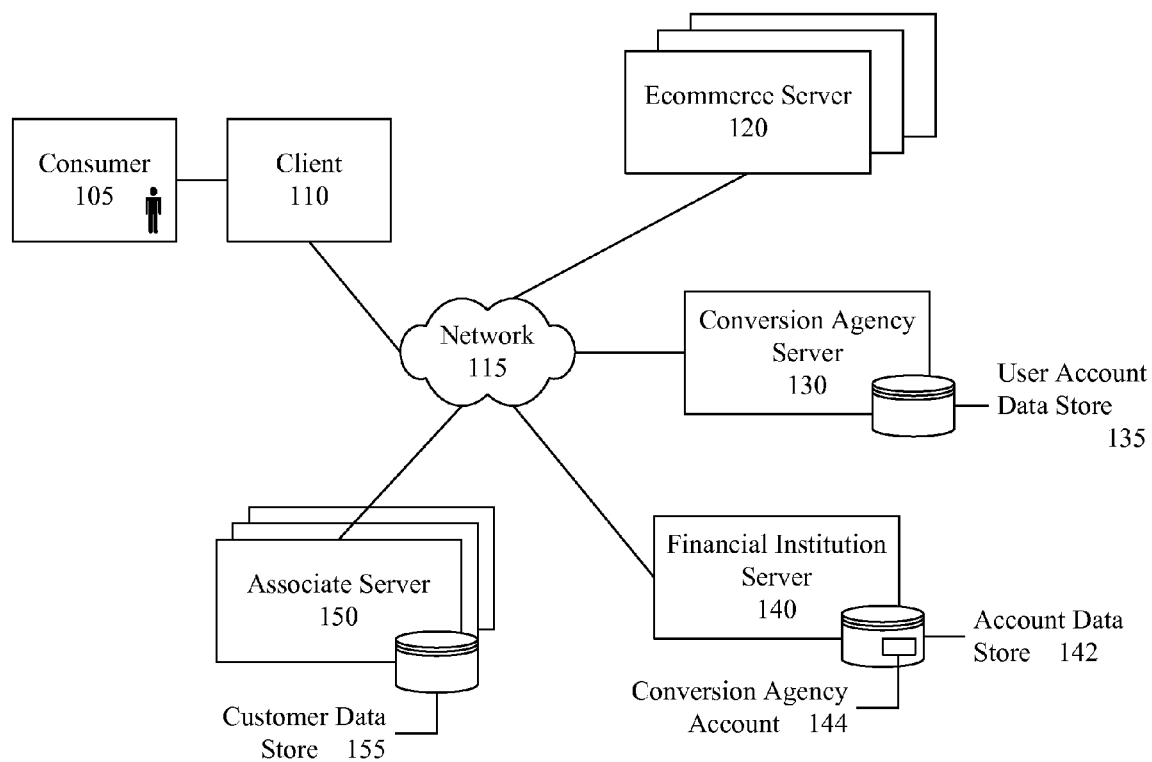
FIG. 1 is a schematic diagram of a Web based conversion of non-negotiable credits associated with an entity to entity independent funds system in accordance with an embodiment of the inventive arrangements disclosed herein.

The present disclosure permits consumers to transform non-negotiable credits provided by an entity to negotiable funds in an approximately immediate fashion using the Web. More specifically, a conversion agency can function as an intermediary that converts entity provided credits into entity independent funds. The conversion agency can be an independent entity that is not directly affiliated with the credit providing entities.

The conversion can occur automatically using a Web initiated action and can have approximately immediate results. Approximately immediate as used herein can signify that a transaction can occur within a single Web session with user acceptable delay tolerances, typically under half an hour and often under a few minutes. In one embodiment, credits can be automatically converted to funds as part of an e-commerce checkout. In another embodiment, credits can be converted into a user accessible account held with a financial institution.

The present disclosure can be implemented in accordance with numerous aspects consistent with material presented herein. For example, one aspect of the present disclosure can include a method for converting credits to funds. The method can include a step of a Web site receiving user identification information. Non-negotiable credits can be identified that are associated with an entity with which the user has previously interacted. The previous interactions could have earned the non-negotiable credits. Responsive to a user request, a conversion agency can convert a quantity of the non-negotiable credits into a quantity of negotiable funds. The conversion agency can be an agency not directly associated with the entity. The user can be permitted to access the quantity of negotiable funds. The quantity of negotiable funds can be applied to user specified purchases. At least a portion of the purchases can involve at least one vender that does not honor the non-negotiable credits.

Another aspect of the present disclosure can include a software method for converting non-negotiable credits into negotiable funds. The method can receive a user request to convert a quantity of non-negotiable credits held in a user account associated with an entity. A conversion rate between the non-negotiable credits available to the user and a form of negotiable funds can be automatically determined. A quantity of non-negotiable credits can be automatically subtracted from the user account. A quantity of the negotiable funds based upon the determined conversion rate and quantity of subtracted funds can be automatically transferred to a financial account. The financial account can be an account that is not associated with the entity. The entire method can occur in an approximately immediate fashion.

Still another aspect of the present disclosure can include a Web-based credit to fund conversion system. The system can include a non-negotiable credit account, a negotiable funds account, and a conversion agency. The non-negotiable credit account can be associated with an entity. Non-negotiable credits contained within the non-negotiable credit account can be earned though previous interactions between a user and the entity. The negotiable funds account can include negotiable funds that the user is able to apply to user specified e-commerce purchases. One or more venders involved in the e-commerce purchases can be venders that do not honor the non-negotiable credits for the e-commerce purchases. The conversion agency can automatically and approximately immediately convert a quantity of credits from the non-negotiable credit account to a quantity of funds in the negotiable funds account responsive to a request from the user.

It should be noted that various aspects of the disclosure can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

FIG. 1 is a schematic diagram of a Web based conversion of non-negotiable credits associated with an entity to entity independent funds system 100 in accordance with an embodiment of the inventive arrangements disclosed herein. System 100 includes consumer 105 and conversion agency server 130.

Consumer 105 interacts with conversion agency server 130 via client 110. Client 110 can be any of a variety of interfaces including, but not limited to, another human being, a personal computer, a kiosk, a graphical user interface (GUI), a Web page, a telephone, a personal data assistant (PDA), a mobile phone, and the like.

Client 110 can operate in a stand-alone fashion. Alternatively, client 110 can be a device that cooperatively participates in a network of distributed computing devices. Client 110 can also be another human being utilizing an alternate form of Client 110 to access conversion agency server 130 via network 115. Network 115 can facilitate data exchanges over wireless as well as line-based communication pathways and protocols.

Both consumer 105 and conversion agency server 130 can interact with associate server 150, e-commerce server 120, and financial institution server 140 via network 115. Conversion agency server 130 includes user account data store 135 in which consumer 105 is a member. Associate server 150 includes customer data store 155 in which consumer 105 is a member. Financial institution server 140 includes account data store 142. Account data store 142 includes conversion agency account 144 corresponding to conversion agency 130.

Consumer 105 earns non-negotiable credits from associate server 150. The quantity of these non-negotiable credits is saved in customer data store 155. The method in which consumer 105 earns credits can be any of a variety of activities including, but not limited to, making online purchases, making in-store purchases, playing online games, participating in online games of chance, participating in surveys, and the like. Consumer 105 uses conversion agency server 130 to convert the non-negotiable credits from associate server 150 into negotiable funds provided by e-commerce server 120 or financial institution 140. In one embodiment, conversion agency 130 can include multiple reward accounts of consumer 105.

For example, consumer 105 earns five hundred credits from participating in an online game of chance hosted by associate server 150. Consumer 105 can choose to use conversion agency 130 to convert any or all of these credits to a monetary equivalent. Conversion agency 130 withdraws the necessary amount from conversion agency account 144 contained within the account data store 142 of financial institution 140 and transfers it to an account specified by consumer 105. In another example, consumer 105 uses conversion agency 130 to complete a purchase at e-commerce server 120. Again, conversion agency 130 withdraws the necessary amount from conversion agency account 144 contained within the account data store 142 of financial institution 140 and transfers it to the account of e-commerce server 120.

E-commerce server 120 can be any Web site that supports online purchases of goods or services. In one embodiment, e-commerce server 120 can include a distinct payment option for conversion agency 130. This distinct payment option could process the conversion of credits through their Web site. Alternatively, the distinct payment option could launch an application to process the conversion of credit that is separate from their Web site. In another embodiment, associate server 150 can act as e-commerce server 120.

Financial institution server 140 can be any of a variety of entities including, but not limited to, a bank, a credit card company, an investment firm, and the like. In one embodiment, financial institution server 140 can reside in the same country as consumer 105 and/or associate server 150. In another embodiment, financial institution server 140 can reside in a country other than that of consumer 105 and/or associate server 150.

Figure 2:
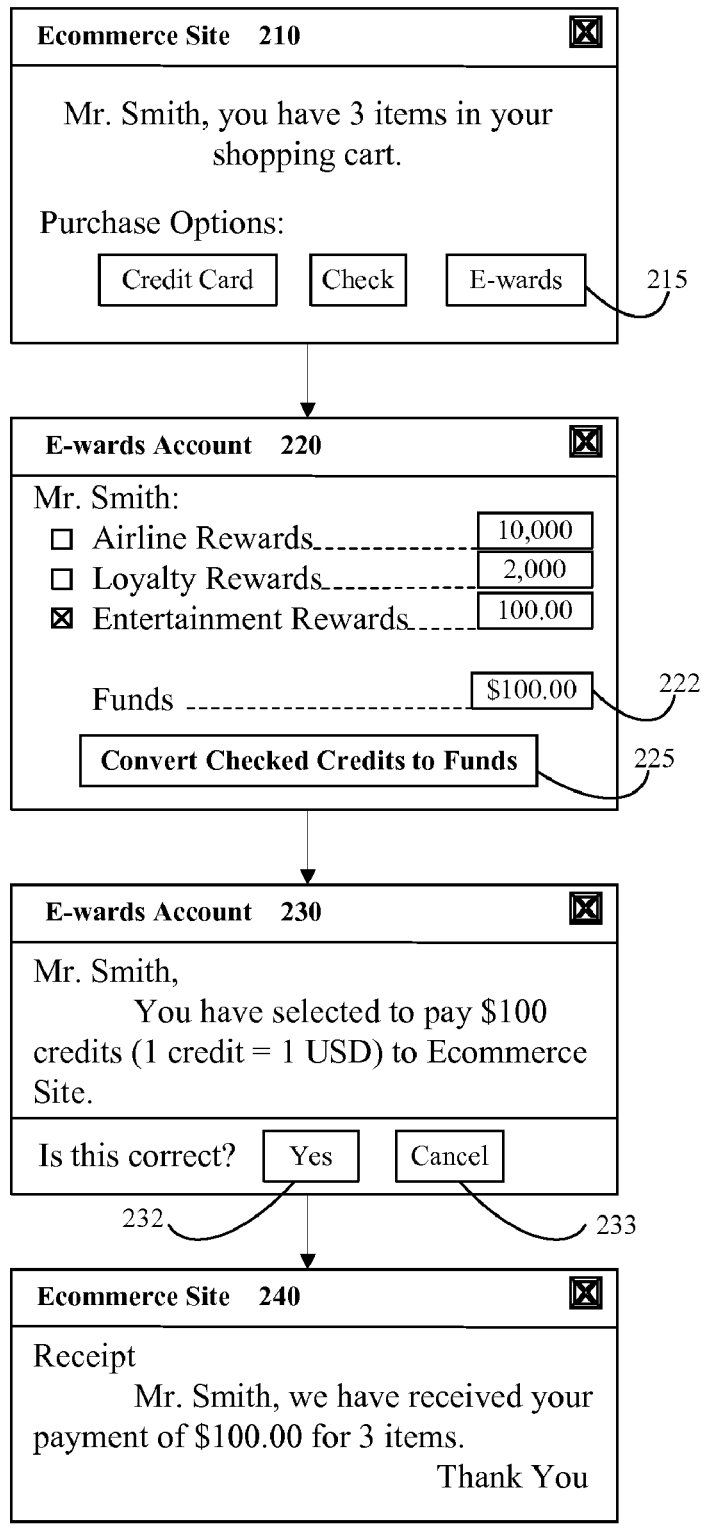
FIG. 2 is a schematic diagram of successive GUIs that illustrate the Web based conversion of non-negotiable credits associated with an entity to entity independent funds system in accordance with an embodiment of the inventive arrangements disclosed herein.

FIG. 2 is a schematic diagram of successive GUIs that illustrate the Web based conversion of non-negotiable credits associated with an entity to entity independent funds system 200 in accordance with an embodiment of the inventive arrangements disclosed herein.

GUI 210 can be a checkout window from any e-commerce site. GUI 210 includes payment button 215. Payment button 215 can represent a payment option that includes the conversion of non-negotiable credits to purchase the items in the shopping cart. Selection of payment button 215 by a user can produce GUI 220.

GUI 220 can be a display window from a conversion agency. GUI 220 includes display box 222 and button 225. GUI 220 can be rendered by any of a variety of means including, but not limited to, a Web browser, a JAVA applet, a PERL script, and the like. In one embodiment, GUI 220 can be contained within the e-commerce site. GUI 220 can display the balance of non-negotiable credits from one or more reward programs. GUI 220 contains a means by which the user selects the type of non-negotiable credits to convert including, but not limited to, a set of radio buttons, a set of checkboxes, a highlighting mechanism, and the like. Display box 222 can display the monetary value of the selected non-negotiable credits. The value displayed in display box 222 can be based on preset conversion factors. Button 225 can represent the initiation of the process by which the selected non-negotiable credits are converted to negotiable funds. Selection of button 225 by a user can produce GUI 230.

GUI 230 can be a display window from a conversion agency. GUI 230 includes yes button 232 and cancel button 233. GUI 230 can be rendered by any of a variety of means including, but not limited to, a Web browser, a JAVA applet, a PERL script, and the like. In one embodiment, GUI 230 can be contained within the e-commerce site. GUI 230 can display a summary message of the transaction initiated by GUI 220. GUI 230 can include a means to continue the transaction, yes button 232, and a means to cancel the transaction, cancel button 233. Selection of cancel button 233 by a user cancels the transaction and can return the user to GUI 220. Selection of yes button 232 by a user completes the transaction initiated in GUI 220 and can produce GUI 240.

GUI 240 can be a display window from the same said e-commerce site. GUI 240 can contain a message acknowledging the successful conversion of the user's non-negotiable credits into negotiable funds for the purchase of the items in the shopping cart.

Figure 3:
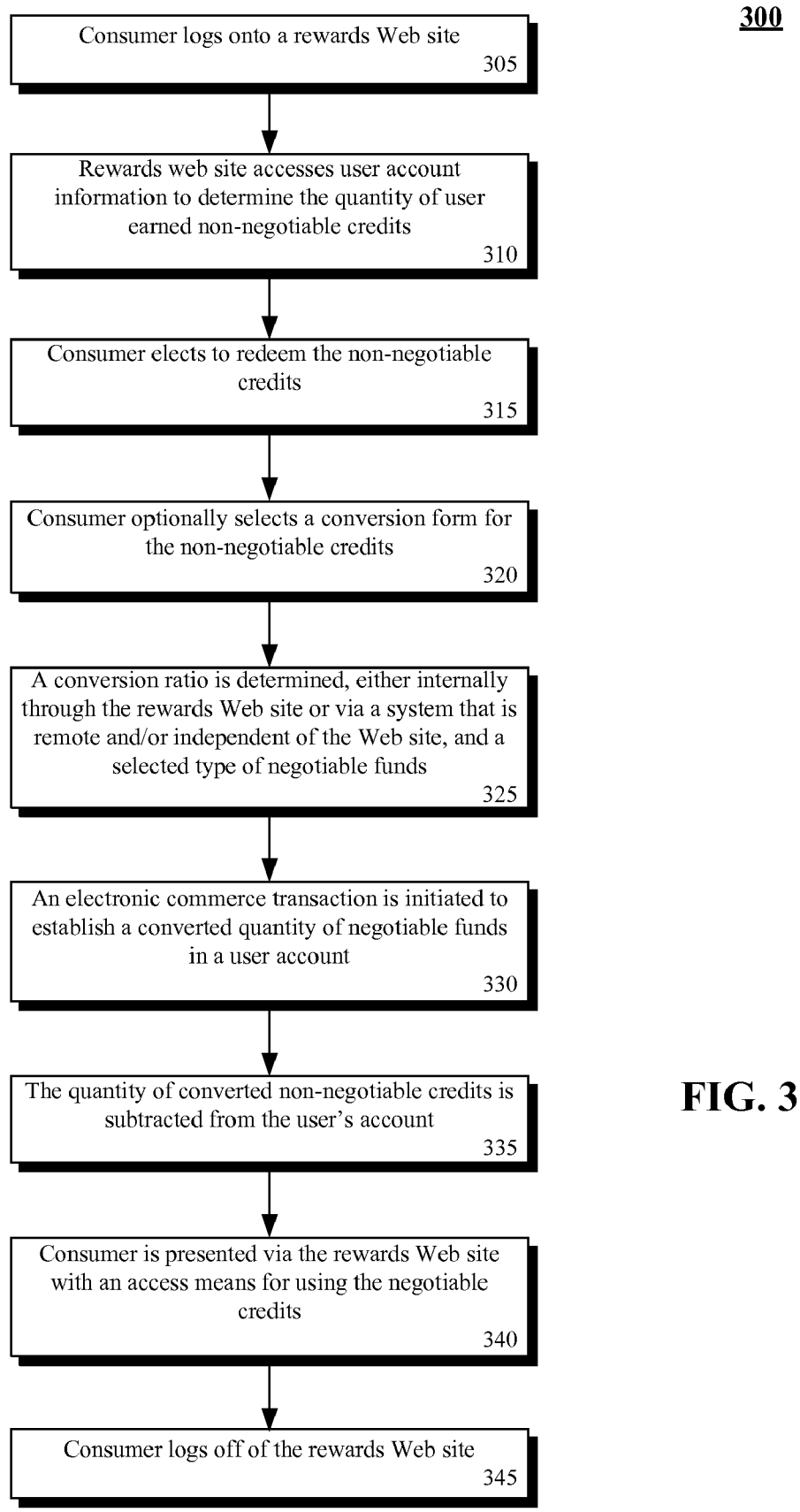
FIG. 3 is a flow chart of a method for the Web based conversion of non-negotiable credits associated with an entity to entity independent funds system in accordance with an embodiment of the inventive arrangements disclosed herein.

FIG. 3 is a flow chart of a method 300 for the Web based conversion of non-negotiable credits associated with an entity to entity independent funds system in accordance with an embodiment of the inventive arrangements disclosed herein.

Method 300 can begin in step 305, where a consumer logs onto a rewards Web site. In step 310, the rewards Web site utilizes the user information provided in step 305 to access the consumer's account information and display the amount of non-negotiable credits in the consumer's account. The consumer elects to redeem some quantity of non-negotiable credits in step 315. If supported by the rewards Web site, step 320 can occur in which the consumer can select the form of negotiable funds to convert the non-negotiable credits. In step 325, a ratio is determined for the conversion of the non-negotiable credits to the selected type of negotiable funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 330 to establish the converted amount of negotiable funds in a user account. The quantity of converted non-negotiable credits is subtracted from the user's account in step 335. In step 340, the rewards Web site presents the consumer with an access means for the negotiable funds. Lastly, the consumer terminates the session by logging off the rewards Web site in step 345.

The present disclosure may be realized in hardware, software, or a combination of hardware and software. The present disclosure may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present disclosure also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This disclosure may be embodied in other forms without departing from the spirit or essential attributes thereof. Accordingly, reference should be made to the following claims, rather than to the foregoing specification, as indicating the scope of the disclosure.

What is claimed is:

1. A method comprising:
   initiating, via computing equipment having at least one processor executing program instructions that are digitally encoded in at least one storage device, a storefront transaction between a consumer and a vender;
   detecting, via computing equipment having at least one processor executing program instructions that are digitally encoded in at least one storage device, a set of one or more goods or services for sale;
   determining, via computing equipment having at least one processor executing program instructions that are digitally encoded in at least one storage device, a cost for the sale in negotiable funds; and
   completing, via computing equipment having at least one processor executing program instructions that are digitally encoded in at least one storage device, the sale, wherein the vender receives an amount of substantially the cost for the sale in negotiable funds in exchange for the one or more goods or services at least a portion of the negotiable funds resulting from a quantity of non-negotiable credits being redeemed, wherein the consumer expends the quantity of non-negotiable credits for the sale as well as zero or more negotiable funds, said zero or more negotiable funds being less than said cost, wherein said non-negotiable credits are earned from previous interactions with an entity, where the quantity of non-negotiable credits are not able to be applied to the sale in absence of having the quantity of non-negotiable credits converted due to the non-negotiable credits having restrictions on their use.

2. The method of claim 1, wherein the quantity of expended non-negotiable credits is converted to a quantity of negotiable funds that the vender receives by a conversion agency, wherein said conversion agency is not said vender.

3. The method of claim 1, wherein the quantity of expended non-negotiable credits is converted to a quantity of negotiable funds that the vender receives by a conversion agency, wherein said conversion agency is not said entity.

4. The method of claim 1, wherein said storefront is an e-commerce storefront.

5. The method of claim 1, wherein said non-negotiable credits are accessible via a payment artifact provided by the entity.

6. The method of claim 1, wherein said non-negotiable credits are earned from previous purchases of goods or services provided by or manufactured by the entity.

7. The method of claim 1, wherein the non-negotiable credits are earned by the consumer utilizing a Web site provided by the entity.

8. The method of claim 1, wherein computing equipment initiating the storefront transaction, determining the set of one or more goods or services, determining a cost for the sale, and completing the sale comprises a server of the vender, said server providing an e-commerce Web site to said consumer, said sale occurring via the e-commerce Web site.

9. The method of claim 1, wherein computing equipment initiating the storefront transaction, determining the set of one or more goods or services, determining a cost for the sale, and completing the sale comprises a check-out device of a physical storefront of the vender, said check-out device being used for said sale.

10. A method comprising:
at least one computing device, executing program instructions stored in at least one non-transitory storage medium, establishing an account for non-negotiable credits provided by an entity to one or more users;
at least one computing device, executing program instructions stored in at least one non-transitory storage medium, detecting interactions between the entity and at least one of the one or more users, each of the interactions earning a quantity of non-negotiable credits, wherein the quantity of non-negotiable credits from the interactions are added to the account, wherein at least one vender does not accept the non-negotiable credits for a sale of goods or services in absence of a conversion operation that converts the non-negotiable credits to negotiable funds; and
at least one computing device, executing program instructions stored in at least one non-transitory storage medium, subtracting a quantity of the non-negotiable credits from the account, said subtracted quantity of non-negotiable credits corresponding to a quantity of negotiable funds in accordance with a conversion rate established for the conversion operation that converts the non-negotiable credits to negotiable funds, wherein the quantity of negotiable funds resulting from the conversion operation are able to be applied to the sale of goods or services with the at least one vender.

11. The method of claim 10, further comprising:
the entity providing a game, which the one or more users play; and
at least one computing device, executing program instructions stored in at least one non-transitory storage medium, granting the one or more users the earned quantity of non-negotiable credits in response to the one or more users playing the game.

12. The method of claim 11, wherein said game is a game of chance.

13. The method of claim 10, wherein said non-negotiable credits are earned by the one or more users utilizing a Web site provided by the entity.

14. The method of claim 10, wherein said non-negotiable credits are earned for previous transactions conducted using a payment artifact provided by the entity.

15. The method of claim 10, wherein said non-negotiable credits are earned from previous purchases of goods manufactured by the entity or are earned from previous purchases of services provided by the entity.

16. The method of claim 10, wherein a conversion agency performs the conversion operation, wherein said conversion agency is not the entity.

17. The method of claim 10, wherein a conversion agency performs the conversion operation, wherein said at least one vender is not the conversion agency.

18. The method of claim 10, wherein a conversion agency performs the conversion operation, wherein said entity and said at least one vender are not the conversion agency.

19. A method comprising:
an entity providing a game, which one or more users play;
the entity providing the one or more users with non-negotiable credits in response to the one or more users playing the game, said non-negotiable credits having restrictions on use, wherein said restrictions on use prevent the non-negotiable credits from being directly applied to one or more purchases of a set of goods, services, or combinations thereof, wherein said entity does not provide the set of goods, services, or combinations thereof to a purchaser, wherein the non-negotiable credits if converted by a conversion agency are able to be applied to the one or more purchases which is not possible in absence of a conversion due to the restrictions on use;
computing equipment recording in a storage device a quantity of unredeemed non-negotiable credits provided by the entity;
the entity providing negotiable funds to a different entity in exchange for non-negotiable credits redeemed, wherein said different entity is not one of the one or more users who played the game and is not the purchaser, wherein said different entity legally receives the non-negotiable credits redeemed after the non-negotiable credits redeemed are applied to the one or more purchases or wherein the different entity legally receives the non-negotiable credits redeemed in response to the non-negotiable credits redeemed being applied to the one or more purchases; and
responsive to the redemption, computing equipment reducing the quantity of unredeemed non-negotiable credits recorded in the storage device by the non-negotiable credits redeemed.

20. The method of claim 19, further comprising:
the entity notifying the one or more users that the non-negotiable credits are able to be converted into negotiable funds by the conversion agency.

21. The method of claim 19, wherein said game is a game of chance.

22. The method of claim 19, wherein said game is a gambling game.

23. The method of claim 19, wherein said game is a game played on a computer by the one or more users.

24. The method of claim 19, wherein said game is a game played within a Web browser by one or more users.

25. The method of claim 19, wherein the providing of the game and the providing the non-negotiable credits are performed by computing equipment having at least one processor executing program instructions that are digitally encoded in at least one storage device.

26. The method of claim 19, wherein said non-negotiable credits comprise rewards points earned by playing the game.

27. The method of claim 19, wherein said non-negotiable credits comprise earnings from a gambling event having a wager, wherein a quantity of earned non-negotiable credits is dependent on a size of the wager.

28. The method of claim 19, wherein said game is a computer game provided by the entity to the one or more users.

29. The method of claim 19, wherein the at least one vender is not the conversion agency.

30. The method of claim 19, wherein said non-negotiable credits are in a form of:
- a set of tokens representing the non-negotiable credits;
- a value digitally encoded in a portable payment artifact having a non-transitory storage medium;
- a value retained in an account of the one or more users, said account being maintained in a network-accessible, non-transitory, storage medium; or
- a voucher indicating the quantity of non-negotiable credits.

* * * * *

UNITED STATES PATENT AND TRADEMARK OFFICE
CERTIFICATE OF CORRECTION

| | | |
|---|---|---|
| PATENT NO. | : 8,201,734 B1 | Page 1 of 1 |
| APPLICATION NO. | : 13/428656 | |
| DATED | : June 19, 2012 | |
| INVENTOR(S) | : Sean I. McGhie and Brian K. Buchheit | |

It is certified that error appears in the above-identified patent and that said Letters Patent is hereby corrected as shown below:

On the Title Page, Item (63)

In the RELATED U.S. APPLICATION DATA the words: "continuation of Application No. 11/420,255, filed on May 25, 2006, now Pat. No. 7,703,673"

should be replaced with: "continuation of Application No. 11/420,255, filed on May 25, 2006, now Pat. No. 7,703,673 and a continuation of Application No. 12/759,506, filed on April 13, 2010, now Pat. No. 8,162,209, and a continuation of Application No. 13/168,814, filed on June 24, 2011, now Pat. No. 8,376,224."

In the Specification

Column 1, lines 9-14

In the CROSS-REFERENCE TO RELATED APPLICATIONS the words: "This continuation application claims the benefit of U.S. patent Ser. No. 11/420,255 filed May 2006 entitled "Web Based Conversion of Non-Negotiable Credits Associated with an Entity to Entity Independent Negotiable Funds. The entire contents of U.S. Application Ser. No. 11/420,255 are incorporated by reference herein."

should be replaced with: "This continuation application claims the benefit of U.S. patent Ser. No. 11/420,255 filed May 2006 entitled "Web Based Conversion of Non-Negotiable Credits Associated with an Entity to Entity Independent Negotiable Funds", now Pat. No. 7,703,673. Priority to Pat. No 7,703,673 is through Pat. No. 8,162,209 (filed April 13, 2010 and issued April 24, 2012) and Pat. No. 8,876,224 (filed June 24, 2011 and issued February 19, 2013, which claims priority to Patent No. 7,703,673 through Pat. No 7,123,127 and Pat. No 8,162,209). The entire contents of U.S. Application Ser. No. 11/420,255 (now Pat. No. 7,703,673) are incorporated by reference herein."

Signed and Sealed this
Twenty-fifth Day of November, 2014

Michelle K. Lee
*Deputy Director of the United States Patent and Trademark Office*